United States Patent
Jha et al.

(10) Patent No.: US 11,075,545 B2
(45) Date of Patent: *Jul. 27, 2021

(54) SYSTEM AND METHOD FOR ACTIVELY CONTROLLING OUTPUT VOLTAGE OF A WIRELESS POWER TRANSFER SYSTEM

(71) Applicant: General Electric Company, Schenectady, NY (US)

(72) Inventors: Kapil Jha, Bangalore (IN); Arun Kumar Raghunathan, Bangalore (IN); Arvind Kumar Tiwari, Bangalore (IN); Deepak Aravind, Bangalore (IN)

(73) Assignee: General Electric Company, Schenectady, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/528,306

(22) Filed: Jul. 31, 2019

(65) Prior Publication Data

US 2019/0356171 A1 Nov. 21, 2019

Related U.S. Application Data

(63) Continuation of application No. 15/794,524, filed on Oct. 26, 2017, now Pat. No. 10,411,516.

(30) Foreign Application Priority Data

Oct. 28, 2016 (IN) .............................. 201641037044

(51) Int. Cl.
*H02J 50/12* (2016.01)
*H02M 3/337* (2006.01)
(Continued)

(52) U.S. Cl.
CPC ............ *H02J 50/12* (2016.02); *H02M 3/337* (2013.01); *H02M 3/33569* (2013.01); *H02J 50/80* (2016.02); *Y02B 70/10* (2013.01)

(58) Field of Classification Search
CPC .......... H02J 50/12; H02J 50/80; H02M 3/337; H02M 3/33569; B60L 53/12; Y02B 70/10; Y02T 10/7072; Y02T 90/14; Y02T 10/70
See application file for complete search history.

(56) References Cited

U.S. PATENT DOCUMENTS 8,004,235 B2    8/2011   Baarman et al.
8,050,068 B2 *   11/2011   Hussmann ................ H02J 1/08
                                                     363/97

(Continued)

FOREIGN PATENT DOCUMENTS

CN         104218640      12/2014
WO      2012085119       6/2012

OTHER PUBLICATIONS

"India Application No. 10-2016-41037044 First Examination Report", dated May 29, 2019, 5 pages.

(Continued)

*Primary Examiner* — Rexford N Barnie
*Assistant Examiner* — Elim Ortiz
(74) *Attorney, Agent, or Firm* — DeLizio Law, PLLC

(57) ABSTRACT

A wireless power transfer system is disclosed. The wireless power transfer system includes a first converting unit for converting a first DC voltage of an input power to a first AC voltage, a contactless power transfer unit for transmitting the input power having the first AC voltage, and a second converting unit for transmitting the power having a second DC voltage corresponding to the first AC voltage to an electric load. Additionally, the wireless power transfer system includes an active voltage tuning unit for controlling the second DC voltage based on a difference between the second DC voltage and a reference voltage and at least one among a difference between the resonant frequency and the constant (Continued)

operating frequency and a difference between a phase angle of the first AC voltage and a phase angle of an AC current.

20 Claims, 6 Drawing Sheets

(51) Int. Cl.
*H02M 3/335* (2006.01)
*H02J 50/80* (2016.01)

(56) References Cited

U.S. PATENT DOCUMENTS

| | | | | |
|---|---|---|---|---|
| 8,093,758 | B2* | 1/2012 | Hussmann | H02J 1/00 307/105 |
| 9,124,113 | B2 | 9/2015 | Hu et al. | |
| 9,153,998 | B2 | 10/2015 | Mayo | |
| 9,412,513 | B2 | 8/2016 | Saitoh | |
| 10,411,516 | B2 | 9/2019 | Jha et al. | |
| 2011/0254379 | A1* | 10/2011 | Madawala | H02J 5/005 307/104 |
| 2013/0049484 | A1* | 2/2013 | Weissentern | H02J 5/005 307/104 |
| 2014/0054970 | A1 | 2/2014 | Keeling et al. | |
| 2014/0153294 | A1* | 6/2014 | Deboy | H02M 3/33569 363/21.04 |
| 2014/0285026 | A1 | 9/2014 | Hori | |
| 2015/0035377 | A1* | 2/2015 | James | H02J 50/80 307/104 |
| 2015/0091516 | A1 | 4/2015 | Blum et al. | |
| 2015/0229225 | A1* | 8/2015 | Jang | H02M 3/33569 363/17 |
| 2016/0156198 | A1* | 6/2016 | Misawa | B60L 3/003 307/104 |
| 2017/0005527 | A1* | 1/2017 | Ishihara | H02J 50/80 |
| 2017/0018973 | A1* | 1/2017 | Murayama | B60L 53/126 |
| 2018/0123398 | A1 | 5/2018 | Jha et al. | |

OTHER PUBLICATIONS

"Korean Application No. 10-2016-41037044 First Examination Report", dated Mar. 29, 2019, 5 pages.

Pagano, et al., "A 0.18-MM Monolithic Li-Ion Battery Charger for Wireless Devices Based on Partial Current Sensing and Adaptive Reference Voltage", IEEE Journal of Solid-Slate Circuits, vol. 17, No. 6, pp. 1355-1368, Jun. 2012, 14 pages.

Peng, et al., "Experimental Analysis on Wireless Power Transmission Based on Magnetic Resonant Coupling", 2nd International Conference on Remote Sensing, Environment and Transportation Engineering (RSETE), 2012, 4 pages.

"Qi System Description Wireless Power Transfer", Wireless Power Consortium, vol. 1:Low Power, Part 1:Interface Definition, Version 1.0.1, Oct. 2010, 88 pages.

* cited by examiner

SYSTEM AND METHOD FOR ACTIVELY CONTROLLING OUTPUT VOLTAGE OF A WIRELESS POWER TRANSFER SYSTEM

CROSS-REFERENCE TO RELATED APPLICATIONS

This application is a Continuation of and claims the priority benefit of U.S. application Ser. No. 15/794,524 filed Oct. 26, 2017 and claims the priority benefit of India Application No. 201641037044 filed Oct. 28, 2016, the disclosures of which are incorporated herein by reference.

FIELD OF INVENTION

Embodiments of the present invention relate generally to wireless power transfer systems and more particularly relate to a system and method for actively controlling an output voltage of a wireless power transfer system.

BACKGROUND OF THE INVENTION

An electric vehicle or a hybrid vehicle, for example, includes one or more batteries that supply electrical power to drive the vehicle. In one example, the batteries supply power to an electric motor to drive a shaft in the vehicle, which in turn drives the vehicle. The batteries may be drained and hence need to be charged from an external power source.

In general, power transfer systems are widely used to transfer power from a power source to one or more electric loads, such as for example, batteries in a vehicle. Typically, the power transfer systems may be contact based power transfer systems or contactless power transfer systems. In the contact based power transfer systems, components such as plug, socket connectors, and wires are physically coupled to the batteries. However, due to environmental impact, such connectors and wires may be affected. Further, establishing a physical connection between the power source and the batteries in the vehicle may involve cumbersome safety measures since high current and voltage are used for charging the batteries.

In the contactless power transfer systems, power converters are used to convert an input power to a transferrable power which is further transmitted to an electric load such as the batteries in a vehicle. The power converter includes switches which are operated at a particular operating/switching frequency to convert the input power to the transferrable power. Typically, depending upon the load, the operating/switching frequency of the power converter is changed to regulate or control an output voltage of the power transfer system. However, if the electric load is disconnected or varied, the output voltage of the power transfer system may attain a very high value in a very short time period. As a result, voltage gain of the power transfer system may also vary drastically. Such a sudden increase in the output voltage and/or drastic variation in the voltage gain may affect one or more components and operation of the power transfer system.

Therefore, there is a need for an improved system and method for actively controlling an output voltage of a wireless power transfer system without changing an operating frequency of the wireless power transfer system.

BRIEF DESCRIPTION OF THE INVENTION

In accordance with an embodiment of the present invention, a wireless power transfer system is disclosed. The wireless power transfer system includes a first converting unit operable at a constant operating frequency and configured to convert a first DC voltage of an input power to a first AC voltage. Further, the wireless power transfer system includes a contactless power transfer unit coupled to the first converting unit and configured to transmit the input power having the first AC voltage, wherein the contactless power transfer unit comprises at least a first power exchange coil and a second power exchange coil magnetically coupled to each other and operable at a resonant frequency. Also, the wireless power transfer system includes a second converting unit coupled to the contactless power transfer unit and configured to receive a power having a second AC voltage corresponding to the first AC voltage from the contactless power transfer unit, convert the second AC voltage of the received power to a second DC voltage, and transmit the power having the second DC voltage to an electric load. In addition, the wireless power transfer system includes an active voltage tuning unit coupled to the contactless power transfer unit and configured to control the second DC voltage based on a difference between the second DC voltage and a reference voltage and at least one among a difference between the resonant frequency and the constant operating frequency and a difference between a phase angle of the first AC voltage and a phase angle of an AC current.

In accordance with an embodiment of the present invention, a method for operating a wireless power transfer system is disclosed. The method includes converting, by a first converting unit, a first DC voltage of an input power to a first AC voltage. Also, the method includes receiving, by a contactless power transfer unit, the input power having the first AC voltage from the first converting unit and transmitting a power having a second AC voltage corresponding to the first AC voltage. In addition, the method includes converting, by a second converting unit, the second AC voltage to a second DC voltage. Furthermore, the method includes transmitting the power having the second DC voltage from the second converting unit to an electric load. In addition, the method includes controlling, by an active voltage tuning unit, the second DC voltage based on a difference between the second DC voltage and a reference voltage and at least one among a difference between a resonant frequency of the contactless power transfer unit and a constant operating frequency of the first converting unit and a difference between a phase angle of the first AC voltage and a phase angle of an AC current.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for actively controlling output voltage of a wireless power transfer system are disclosed. In particular, the system and method disclosed herein employ an active voltage tuning unit to change an impedance of the wireless power transfer system, which in turn controls the output voltage of the wireless power transfer system.

Figure 1:
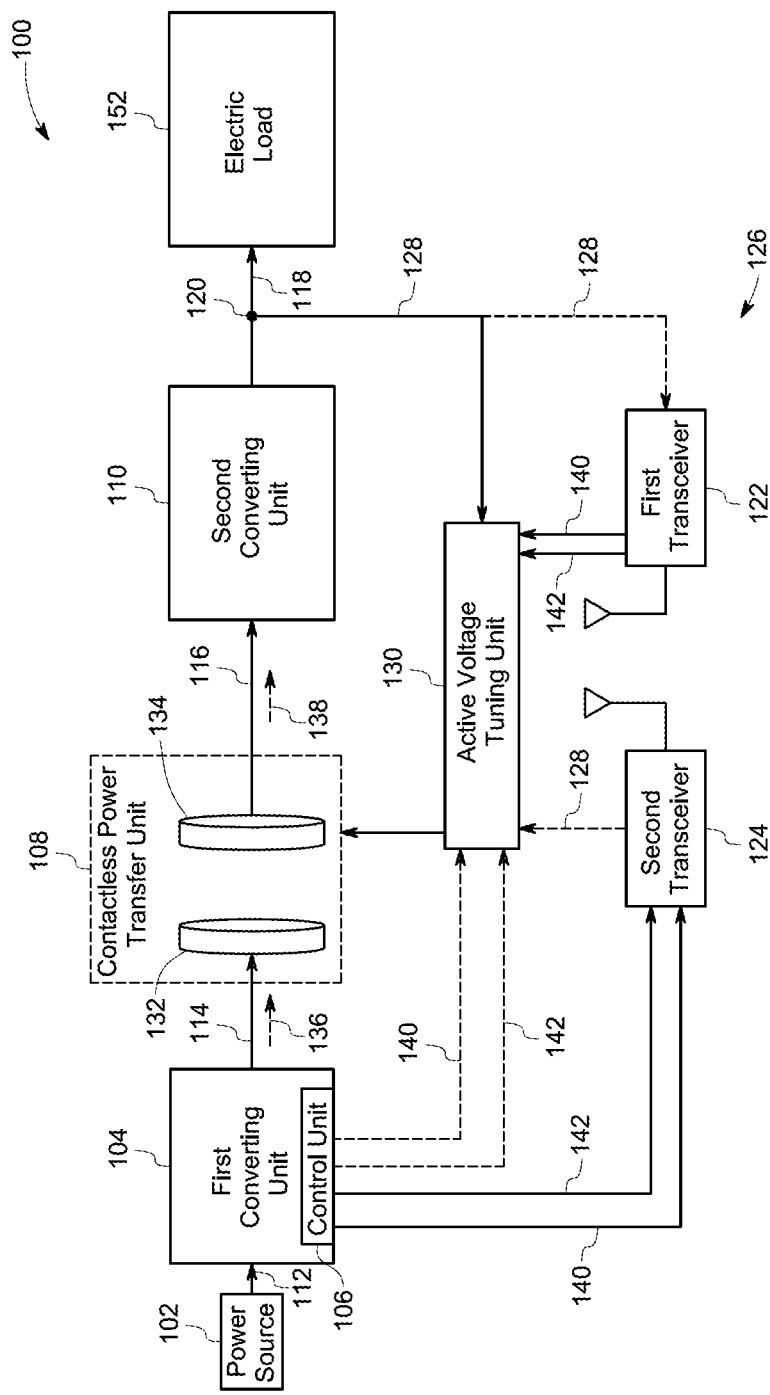
FIG. 1 is a block diagram representation of a wireless power transfer system having an active voltage tuning unit.

FIG. 1 is a diagrammatical representation of a wireless power transfer system 100. The wireless power transfer system 100 is used to transmit an electrical power from a power source 102 to one or more electric loads 152 such as batteries, mobile devices such as cell phones, laptops, "heating, ventilation, air conditioning" (HVAC) systems, and the like. Particularly, in an automobile industry, an electric vehicle or a hybrid vehicle includes one or more batteries that supply electrical power to drive the vehicle. Such batteries may be electrically charged from the power source 102 via the wireless power transfer system 100. In one embodiment, the wireless power transfer system 100 may also be referred to as a contactless power transfer system.

In the illustrated embodiment, the wireless power transfer system 100 includes a first converting unit 104 (inverter), a contactless power transfer unit 108, and a second converting unit 110 (rectifier). The first converting unit 104 is electrically coupled to the power source 102. The power source 102 is configured to supply an input power having a first DC voltage 112 to the first converting unit 104. In some embodiments, the input power may be in a range from about 100 W to about 6.6 kW. In one embodiment, the power source 102 may be a part of the wireless power transfer system 100. In another embodiment, the power source 102 may be positioned external to the wireless power transfer system 100.

The first converting unit 104 is configured to receive the input power having the first DC voltage 112 from the power source 102. Further, the first converting unit 104 is configured to operate at an operating frequency to convert the first DC voltage 112 of the input power to a first AC voltage 114. The operating frequency may be referred to as a frequency of switching pulses that are provided to switches (not shown) in the first converting unit 104 to convert the first DC voltage 112 of the input power to the first AC voltage 114. Also, the operating frequency may be pre-determined based on the one or more electric loads 152 and/or impedance of the wireless power transfer system 100. In one embodiment, the first converting unit 104 may include a control unit 106 that performs one or more functions based on pre-stored instructions or programs to determine the operating frequency. Upon converting the first DC voltage 112 of the input power to the first AC voltage 114, the first converting unit 104 is further configured to transmit the input power having the first AC voltage 114 to the contactless power transfer unit 108.

The contactless power transfer unit 108 includes at least a first power exchange coil 132 and a second power exchange coil 134 that are magnetically coupled to each other. Specifically, the first power exchange coil 132 is coupled to the first converting unit 104 and the second power exchange coil 134 is coupled to the second converting unit 110. It may be noted that the contactless power transfer unit 108 may include two or more such power exchange coils or an array of coils that are magnetically coupled to each other. The first power exchange coil 132 and the second power exchange coil 134 are used for wirelessly transmitting the input power having the first AC voltage 114 from the first converting unit 104 to the second converting unit 110 as a second AC voltage 116. Particularly, a first AC current 136 corresponding to the first AC voltage 114 flows through the first power exchange coil 132 resulting in excitation of the first power exchange coil 132, which in turn generates a magnetic field that excites the second power exchange coil 134. When the second power exchange coil 134 is excited by the generated magnetic field, a second AC current 138 corresponding to the second AC voltage 116 flows through the second power exchange coil 134. Further, the input power having the second AC voltage 116 is then transmitted from the second power exchange coil 134 to the second converting unit 110.

In one embodiment, the contactless power transfer unit 108 may include one or more resonant coils (not shown) between the first power exchange coil 132 and the second power exchange coil 134. Such resonant coils may be electrically coupled to a resonant circuit (not shown) to enhance the transmission of the input power to the second converting unit 110. In one example, the resonant circuit may operate or oscillate at a resonant frequency that is proximate to the operating frequency of the first converting unit 104. The details pertaining to transmitting the power using the power exchange coils 132, 134 are explained in greater detail below with reference to FIG. 2.

Upon receiving the power having the second AC voltage 116 from the contactless power transfer unit 108, the second converting unit 110 is configured to convert the second AC voltage 116 of the input power to a second DC voltage ($V_o$) 118. Further, the second converting unit 110 is configured to transmit the input power having the second DC voltage 118 to the one or more electric loads 152. In one embodiment, the input power having the second DC voltage 118 may be used for charging the electric load including one or more batteries that are coupled to the wireless power transfer system 100.

Additionally, the wireless power transfer system 100 includes a voltage sensor 120, a first transceiver 122, and a second transceiver 124 that together form a feedback loop 126. The voltage sensor 120 is used to sense the second DC voltage (output voltage) 118. The feedback loop 126 is used to transmit a voltage signal ($V_o$) 128 representative of the second DC voltage 118 from the voltage sensor 120 to the control unit 106 of the first converting unit 104 via the first transceiver 122 and the second transceiver 124.

In conventional power transfer systems, a control unit is used to adjust the operating frequency of the first converting unit based on a received voltage signal to control or regulate an output voltage across an electric load. However, since the voltage signal ($V_o$) is communicated using a wireless communication path between the first transceiver and the second transceiver, the control unit may receive the voltage signal ($V_o$) after a certain time delay. In one embodiment, the delay may be in a range from about 1 millisecond to about 5 milliseconds. In such a scenario, the control unit may not be able to timely control the output voltage across the electric load due to the delay in communicating the voltage signal. As a result, the output voltage may increase above a critical value and the voltage gain may vary substantially, which in turn may affect the converting unit and/or other components in the wireless power transfer system. The critical value may be a voltage value above which the components in the wireless power transfer system may be affected. In one embodiment, the critical value may be in a range from about 400V to about 500V.

To overcome the issues related to increase of the output voltage above the critical value, the exemplary wireless power transfer system 100 includes an active voltage tuning unit 130 to control the second DC voltage 118 across the one or more electric loads 152. Particularly, the first converting unit 104 is configured to operate at a constant operating frequency. Further, the active voltage tuning unit 118 is configured to control the second DC voltage 118 across the one or more electric loads 152 without changing the constant operating frequency of the first converting unit 104. Variation of a voltage gain of the wireless power transfer system 100 is substantially minimized by controlling the second DC voltage. It should be noted that the voltage gain is referred to as a ratio of the second DC voltage 118 and the first DC voltage 112.

Specifically, the active voltage tuning unit 130 is electrically coupled to the contactless power transfer unit 108. More specifically, in one embodiment, the active voltage tuning unit 130 is coupled to the first power exchange coil 132. In another embodiment, the active voltage tuning unit 130 is coupled to the second power exchange coil 134.

In the embodiment where the active voltage tuning unit 130 is coupled to the second power exchange coil 134, the active voltage tuning unit 130 is electrically coupled to the voltage sensor 120 to receive the voltage signal ($V_o$) 128 representative of the second DC voltage 118. The active voltage tuning unit 130 is further coupled to the first converting unit 104 via the first transceiver 122 and the second transceiver 124 to receive a frequency signal 140 from the first converting unit 104. The frequency signal 140 is representative of a difference between the constant operating frequency and the resonant frequency. In one example, if the frequency signal 140 includes binary "1", then the resonant frequency is greater than the constant operating frequency. Similarly, if the frequency signal 140 includes binary "0", then the resonant frequency is lesser than the constant operating frequency.

Furthermore, the active voltage tuning unit 130 is configured to receive a phase signal 142 from the first converting unit 104 via the first transceiver 122 and the second transceiver 124. The phase signal 142 is representative of a difference between a phase angle of the first AC voltage 114 and a phase angle of the first AC current 136. In one embodiment, if the phase signal 142 includes binary "1", then the phase angle of the first AC current 136 is less than the phase angle of the first AC voltage 114. In other words, the phase angle of first AC current 136 is lagging the phase angle of the first AC voltage 114. If the phase angle of the first AC current 136 is less than the phase angle of the first AC voltage 114, the active voltage tuning unit 130 determines that the contactless power transfer unit 108 is inductive in nature/operation. Similarly, if the phase signal 142 includes binary "0", then the phase angle of the first AC current 136 is greater than the phase angle of the first AC voltage 114. In other words, the phase angle of first AC current 136 is leading the phase angle of the first AC voltage 114. If the phase angle of the first AC current 136 is greater than the phase angle of the first AC voltage 114, the active voltage tuning unit 130 determines that the contactless power transfer unit 108 is capacitive in nature/operation.

Further, in the embodiment of coupling the active voltage tuning unit 130 to the first power exchange coil 132, the active voltage tuning unit 130 is electrically coupled to the voltage sensor 120 via the first transceiver 122 and the second transceiver 124 to receive the voltage signal ($V_o$) 128 (represented by dotted lines in FIG. 1). The active voltage tuning unit 130 is directly coupled to the first converting unit 104 to receive the frequency signal 140 and the phase signal 142 from the first converting unit 104 (represented by dotted lines in FIG. 1).

During operation, the active voltage tuning unit 130 determines whether the contactless power transfer unit 108 is inductive or capacitive in nature based on the phase signal 142. Further, the active voltage tuning unit 130 compares the second DC voltage ($V_o$) 118 with a reference voltage ($V_{ref}$) and the resonant frequency with the constant operating frequency. It may be noted that the reference voltage is a voltage value that is predetermined based on one or more characteristics of the one or more electric loads 152. In one embodiment, this reference voltage value may be changing depending on change in the characteristics of the electric load 152. Further, in one embodiment, the active voltage tuning unit 130 changes an impedance of the contactless power transfer unit 108 based on the difference between the phase angle of the first AC current 136 and the phase angle of the first AC voltage 114 and the difference between the reference voltage and the second DC voltage 118. As a consequence, the second DC voltage 118 is controlled to a value proximate or equal to the reference voltage. In another embodiment, the active voltage tuning unit 130 changes an impedance of the contactless power transfer unit 108 based on the difference between the resonant frequency and the constant operating frequency and the difference between the reference voltage and the second DC voltage 118. As a result, the second DC voltage 118 is controlled to a value proximate or equal to the reference voltage The active voltage tuning unit 130 is configured to regulate the second DC voltage 118 without decoupling the one or more electric loads 152 from the contactless power transfer unit 108 and/or without changing the constant operating frequency of the first converting unit 104. Further, variation of the voltage gain of the wireless power transfer system 100 is substantially minimized, which in turn reduces stress on the components of the wireless power transfer system 100. The aspect of controlling the second DC voltage 118 is described in greater detail with reference to FIGS. 2 and 3.

Figure 2:
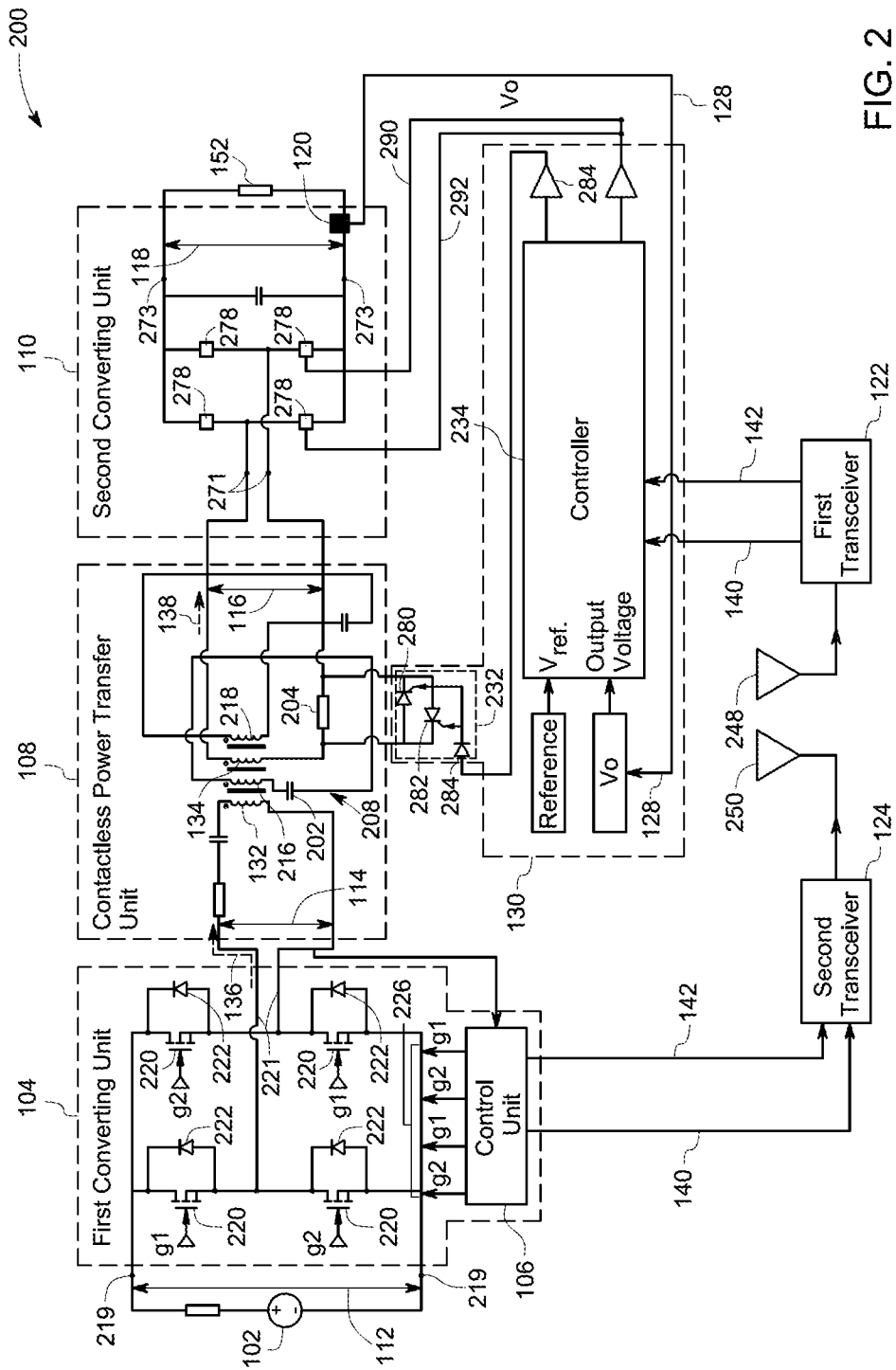
FIG. 2 is a detailed schematic representation of a wireless power transfer system.

Referring to FIG. 2, a schematic representation of the wireless power transfer system 200 in accordance with an embodiment of the present invention is depicted. In the embodiment of FIG. 2, the active voltage tuning 130 is electrically coupled to the second power exchange coil 134. The first converting unit 104 includes a plurality of switches 220 and diodes 222 that are electrically coupled between an input terminal 219 and an output terminal 221. In one embodiment, the switches 220 include electronic switches such as MOSFETs or IGBTs. The switches 220 are activated and deactivated based on the constant operating frequency of the first converting unit 104 to convert the first DC voltage 112 of the input power to the first AC voltage 114. Particularly, the control unit 106 of the first converting unit 104 is configured to send one or more gate signals 226 that are representative of the operating frequency to the plurality of switches 220 to convert the first DC voltage 112 of the input power to the first AC voltage 114. In one example, the control unit 106 may include one or more of an arithmetic logic unit, a microprocessor, a general purpose controller, and a processor array to perform desired computations/functions. While the control unit 106 is shown as a single unit, in certain embodiments, the control unit 106 may include more than one processor co-located or distributed in different locations. In one embodiment, a non-transitory computer readable medium may be encoded with a program having a sequence of instructions to instruct the control unit 106 to perform desired computations/functions. It may be noted that the constant operating frequency may also be referred as a switching frequency of the first converting unit 104.

In the illustrated embodiment, the contactless power transfer unit 108 includes the first power exchange coil 132, the second power exchange coil 134, a resonant coil 216, and a compensation coil 218. The resonant coil 216 is positioned between the first power exchange coil 132 and the second power exchange coil 134. Further, the resonant coil 216 is magnetically coupled to the first power exchange coil 132 and the second power exchange coil 134. In the exemplary embodiment, the resonant coil 216 is coupled in series with a capacitor 202 to form a resonant circuit 208. In one embodiment, the resonant circuit 208 is operated at a resonant frequency that is proximate to the constant operating frequency to enhance the transmission of the input power to the second converting unit 110. The magnetic field generated by the first power exchange coil 132 excites the resonant coil 216, which in turn aids in focusing the generated magnetic field towards the second power exchange coil 134. The compensation coil 218 is magnetically coupled to the second power exchange coil 134. The compensation coil 218 is configured to match an impedance of the contactless power transfer unit 108 with the impedance of the second converting unit 110.

The second converting unit 110 includes a plurality of switches 278 that are electrically coupled between an input terminal 271 and an output terminal 273. The switches 278 are arranged to form a bridge rectifier configured to convert the second AC voltage 116 to the second DC voltage 118. In some embodiments, the switches 278 may be controlled switches such as MOSFETs, IGBTs or uncontrolled switches such as diodes. The sensor 120 is electrically coupled to the output terminal 273 of the second converting unit 110.

The first transceiver 122 has an antenna 248 configured to receive the frequency signal 140 and the phase signal 142 from an antenna 250 of the second transceiver 124. Further, the first transceiver 122 is configured to transmit the frequency signal 140 and the phase signal 142 to a controller 234. In one embodiment, the first transceiver 122 is positioned proximate to the one or more electric loads 152. The second transceiver 124 is positioned proximate to the first converting unit 104 and/or the power source 102.

The active voltage tuning unit 130 includes a switching sub-unit 232 and the controller 234 coupled to each other. The controller 234 is configured to generate a switching signal 284 having a plurality of switching pulses. Also, the controller 234 is further configured to vary a duty cycle of the switching pulses of the switching signal 284 based on the voltage signal 128, the frequency signal 140, and the phase signal 142. Further, the controller 234 is configured to transmit the switching signal 284 having the varied duty cycle to the switching sub-unit 232. In one embodiment, the controller 234 is configured to generate rectifier control signals 290, 292 having a plurality of switching pulses based on a difference between the second DC voltage 118 and a reference voltage. The controller 234 is further configured to transmit the rectifier control signals 290, 292 to the switches 278 of the second converting unit 110 to control the second DC voltage 118. In one embodiment, the controller 234 concurrently sends the rectifier control signals 290, 292 and the switching signal 284. In another embodiment, the controller 234 may alternately send the rectifier control signals 290, 292 and the switching signal 284. Further, it may be noted that the controller 234 may include one or more of an arithmetic logic unit, a microprocessor, and a processor array to perform desired computations/functions. While the controller 234 is shown as a single unit, in certain embodiments, the controller 234 may include more than one controller co-located or distributed in different locations. In one embodiment, a non-transitory computer readable medium may be encoded with a program having a sequence of instructions to instruct the controller 234 to perform desired computations/functions.

The switching sub-unit 232 includes a first electronic switch 280 and a second electronic switch 282 that are coupled antiparallel to each other. In one embodiment, the first and second electronic switches 280, 282 include thyristors. Further, these first and second electronic switches 280 are coupled in parallel to an impedance element 204 coupled in series with the second power exchange coil 134. The first and second electronic switches 280, 282 are activated and deactivated based on the switching signal 284 generated by the controller 234 to change the impedance of the second power exchange coil 134. More specifically, the varied duty cycle of the switching signal 284 changes the impedance of the second power exchange coil 134, which in turn changes overall impedance of the contactless power transfer unit 108. As a result, the second DC voltage 118 is controlled to regulate the second DC voltage 118 to a value proximate or equal to the reference voltage. It may be noted that the switching sub-unit 232 may include any type of electronic switches capable of allowing the second AC current 138 to bypass the impedance element 204 when the electronic switches are activated.

During operation, the active voltage tuning unit 130 receives the voltage signal 128 from the voltage sensor 120. The activate voltage tuning unit 130 further receives the frequency signal 140 and the phase signal 142 from the first converting unit 104 via the first and second transceivers 122, 124. Further, the controller 234 determines a difference between the phase angle of the first AC current 136 and the first AC voltage 114. Further, the controller 234 determines a difference between the second DC voltage 118 and the reference voltage. In addition, the controller 234 determines a difference between the resonant frequency and the constant operating frequency.

In one embodiment, if the second DC voltage 118 is less than the reference voltage and if the resonant frequency is less than the constant operating frequency and/or the phase angle of the first AC current 136 is less than the phase angle of the first AC voltage 114, the controller 234 increases the duty cycle of the switching signal 284 to increase the second DC voltage 118 across the one or more electric loads 152. Particularly, the controller 234 determines that the contactless power transfer unit 108 is inductive in nature. The controller 234 increases the duty cycle of the switching pulses of the switching signal 284 corresponding to the difference between the second DC voltage 118 and the reference voltage and the difference between the resonant frequency and the constant operating frequency. As a result, the impedance of the second power exchange coil 134 is reduced and the second DC voltage 118 is increased across the one or more electric loads 152 to match the reference voltage. In one embodiment, the second DC voltage 118 is increased to a value proximate or equal to the reference voltage.

If the second DC voltage 118 is greater than the reference voltage and if the resonant frequency is less than the constant operating frequency and/or the phase angle of the first AC current 136 is less than the phase angle of the first AC voltage 114, the controller 234 decreases the duty cycle of the switching signal 284 to decrease the second DC voltage 118 across the one or more electric loads 152. Particularly, the controller 234 determines that the contactless power transfer unit 108 is inductive in nature. The controller 234 decreases the duty cycle of the switching pulses of the switching signal 284 corresponding to the difference between the second DC voltage 118 and the reference voltage and the difference between the resonant frequency and the constant operating frequency. As a result, the impedance of the second power exchange coil 134 is reduced and the second DC voltage 118 is reduced across the one or more electric loads 152 to match the reference voltage. In one embodiment, the second DC voltage 118 is decreased to a value that is proximate or equal to the reference voltage.

If the second DC voltage 118 is less than the reference voltage and if the resonant frequency is greater than the constant operating frequency and/or the phase angle of the first AC current 136 is greater than the phase angle of the first AC voltage 114, the controller 234 decreases the duty cycle of the switching signal 284 to increase the second DC voltage 118 across the one or more electric loads 152. Particularly, the controller 234 determines that the contactless power transfer unit 108 is capacitive in nature. Further, the controller 234 decreases the duty cycle of the switching pulses of the switching signal 284 corresponding to the difference between the second DC voltage 118 and the reference voltage and the difference between the resonant frequency and the constant operating frequency. As a result, the impedance of the second power exchange coil 134 is increased and the second DC voltage 118 is increased across the one or more electric loads 152 to match the reference voltage.

If the second DC voltage 118 is greater than the reference voltage and if the resonant frequency is greater than the constant operating frequency and/or the phase angle of the first AC current 136 is greater than the phase angle of the first AC voltage 114, the controller 234 increases the duty cycle of the switching signal 284 to decrease the second DC voltage 118 across the one or more electric loads 152. Particularly, the controller 234 determines that the contactless power transfer unit 108 is capacitive in nature. The controller 234 increases the duty cycle of the switching pulses of the switching signal 284 corresponding to the difference between the second DC voltage 118 and the reference voltage and the difference between the resonant frequency and the constant operating frequency. As a result, the impedance of the second power exchange coil 134 is reduced and the second DC voltage 118 is reduced across the electric load 152 to match the reference voltage.

Thus, the controller 234 controls the second DC voltage 118 across the one or more electric loads 152 by varying the duty cycle of the switching signal 284. Moreover, the second DC voltage 118 is controlled without decoupling the one or more electric loads 152 from the wireless power transfer system 100. The second DC voltage 118 is controlled without changing the operating frequency of the wireless power transfer system 100. Further, variation of the voltage gain of the wireless power transfer system 100 is substantially minimized, which in turn reduces stress on the components of the wireless power transfer system 100.

Figure 3:
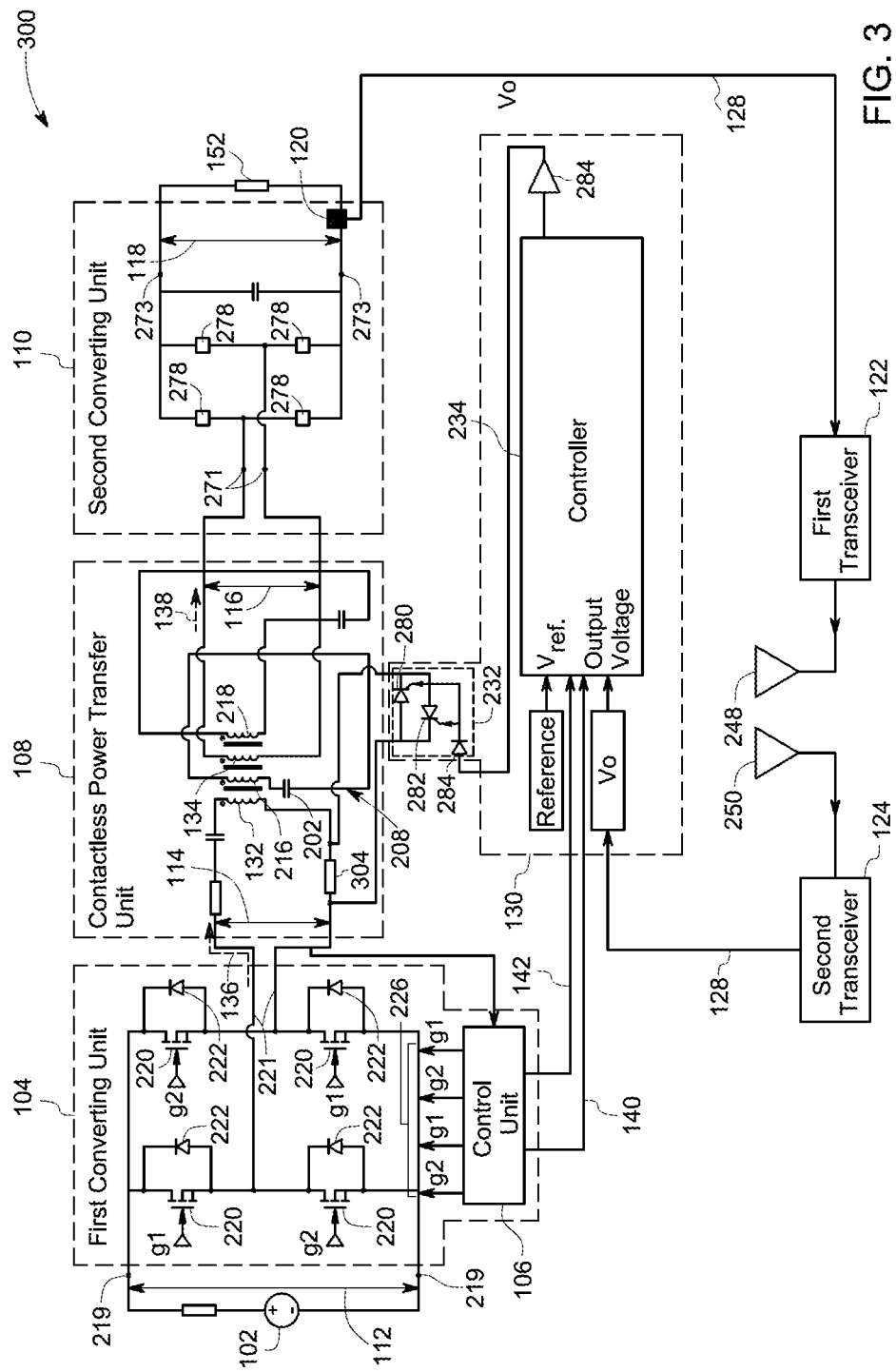
FIG. 3 is a detailed schematic representation of a wireless power transfer system.

Referring to FIG. 3, a schematic representation of a wireless power transfer system 300 in accordance with an embodiment of the present invention is depicted. The wireless power transfer system 300 is similar to the wireless power transfer system 200 of FIG. 2 except that the active voltage tuning unit 130 is coupled to the first power exchange coil 132. Particularly, the active voltage tuning unit 130 is coupled in parallel to an impedance element 304 coupled in series to the first power exchange coil 132. The active voltage tuning unit 130 is configured to receive the voltage signal 128 from the voltage sensor 120 via the first transceiver 122 and the second transceiver 124. In addition, the active voltage tuning unit 130 is directly coupled to the first converting unit 104 to receive the frequency signal 140 and the phase signal 142 from the control unit 106. As discussed earlier, the second DC voltage 118 is controlled based on the difference between the second DC voltage 118 and the reference voltage and at least one among the difference between the resonant frequency and the constant operating frequency and the difference between the phase angle of the first AC current 136 and the phase angle of the first AC voltage 114.

Figure 4:
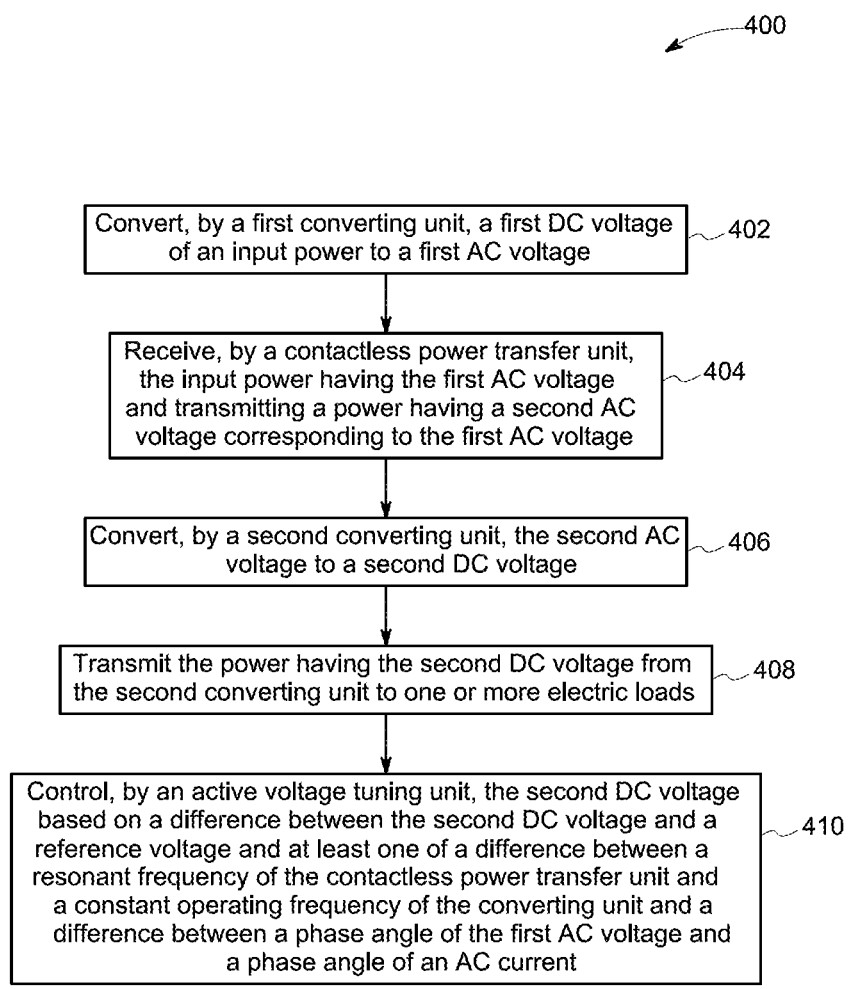
FIG. 4 is a flow chart illustrating a method for protecting a wireless power transfer system.

Referring to FIG. 4, a flow chart illustrating a method 400 for protecting a wireless power transfer system in accordance with an embodiment of the present invention is depicted. At step 402, a first DC voltage of an input power is converted to a first AC voltage by a first converting unit. The first converting unit is operated at a determined switching frequency to convert the first DC voltage of the input power to the first AC voltage.

Subsequently, at step 404, the method includes receiving the input power having the first AC voltage, by a contactless power transfer unit, and then transmitting a power having a second AC voltage corresponding to the first AC voltage. The contactless power transfer unit transmits the power having the second AC voltage to a second converting unit. Further, at step 406, the second AC voltage of the received power is converted to a second DC voltage by a second converting unit. At step 408, the power having the second DC voltage is transmitted from the second converting unit to one or more electric loads. In one embodiment, the one or more electric loads may be one or more batteries that are electrically charged using the input power having the second DC voltage received from the second converting unit.

At step 410, the method includes controlling the second DC voltage based on a difference between the second DC voltage and the reference voltage, and at least one among a difference between the resonant frequency and the constant operating frequency and a difference between a phase angle of the first AC voltage and a phase angle of an AC current. The controller varies the duty cycle of a switching signal based on the difference between the second DC voltage and the reference voltage and one among the difference between the resonant frequency and the constant operating frequency and a difference between a phase angle of the first AC current and the phase angle of the first AC voltage. Further, the controller transmits the switching signal having the varied duty cycle to a switching sub-unit to control the second DC voltage across the one or more electric loads.

Figure 5:
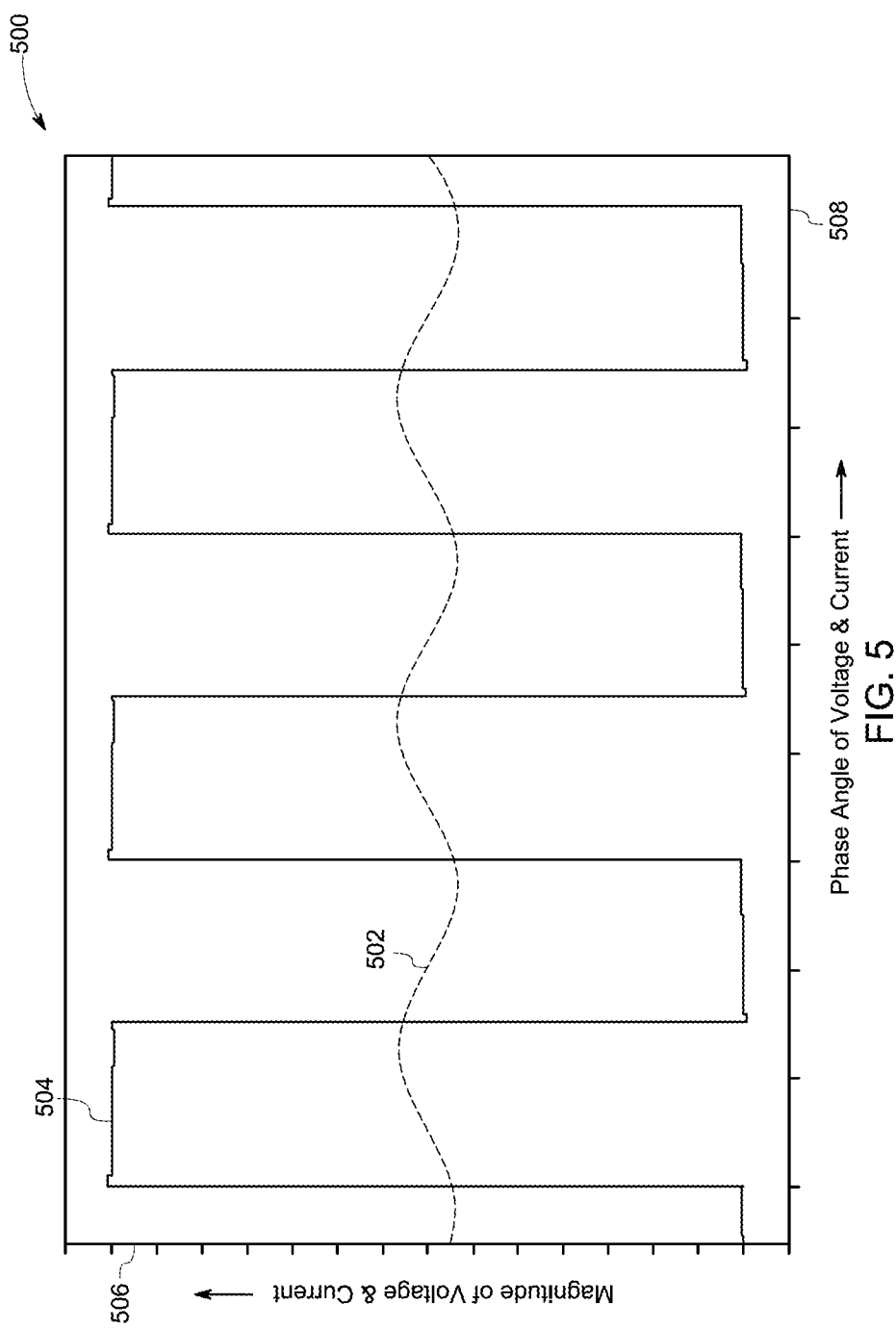
FIG. 5 is graphical representation of variation of a first AC current with reference to a first AC voltage.

Referring to FIG. 5, a graphical representation 500 of variation of the first AC current with reference to the first AC voltage in accordance with an embodiment of the present invention is depicted. Reference numeral 506 represents Y-axis that is indicative of magnitude of the first AC current and the first AC voltage. Similarly, reference numeral 508 represents X-axis that is indicative of phase angle of the first AC current and the first AC voltage. Further, reference numeral 502 is representative of a current waveform of the first AC current of the wireless power transfer system. Similarly, reference numeral 504 is representative of a voltage waveform of the first AC voltage of the wireless power transfer system. In the illustrated embodiment, the phase angle of the current waveform 502 is lagging with reference to the phase angle of the voltage waveform 504.

Particularly, the phase angle of the first AC current is less than the phase angle of the first AC voltage, which in turn indicates that the contactless power transfer unit is inductive in nature/operation.

Figure 6:
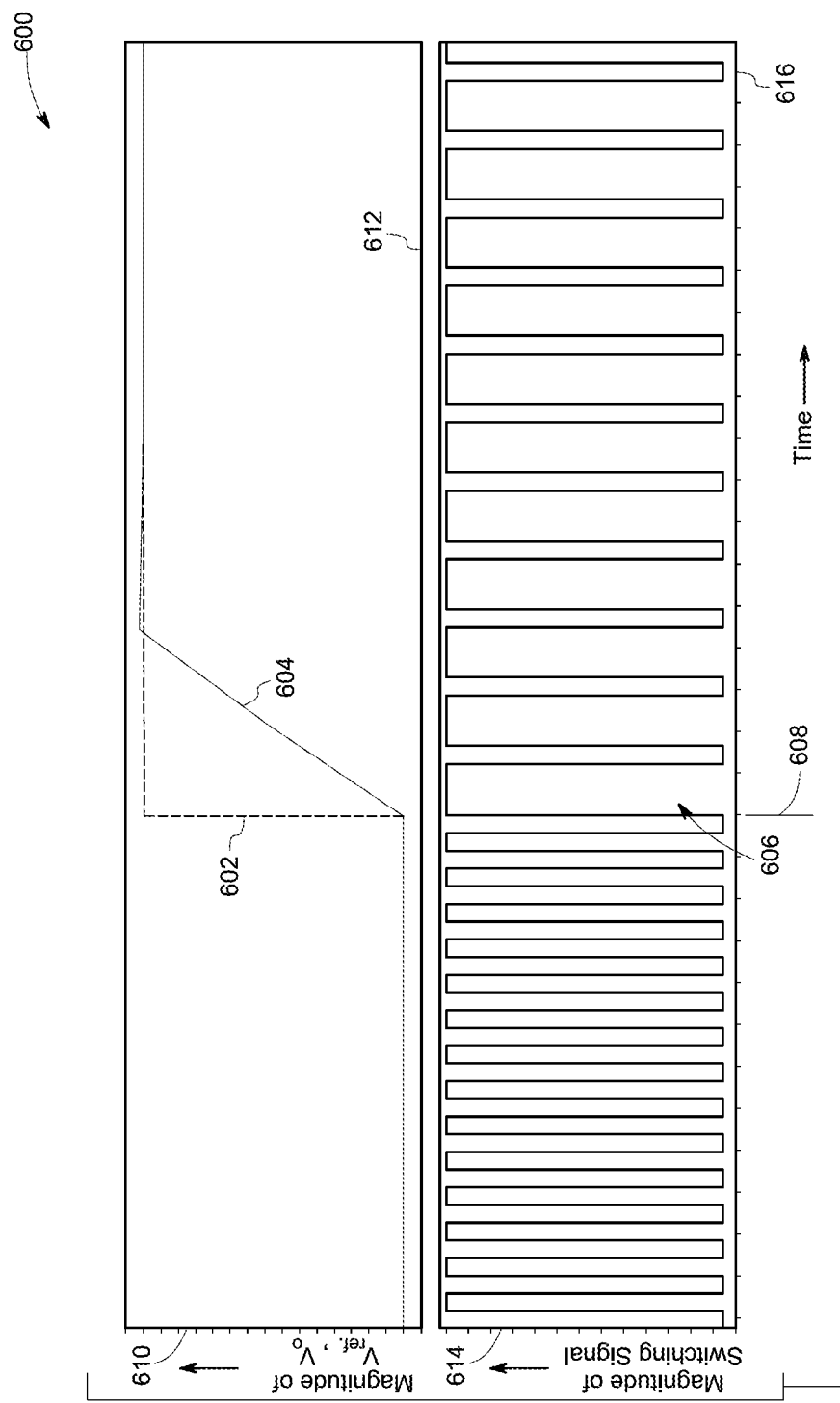
FIG. 6 is graphical representation of a second DC voltage, a reference voltage, and a switching signal.

Referring to FIG. 6, a graphical representation 600 of variation of a second DC voltage, a reference voltage, and a switching signal from the controller in accordance with an embodiment of the present invention is depicted. Reference numeral 610 represents Y-axis that is indicative of magnitude of the second DC voltage ($V_o$), the reference voltage ($V_{ref}$). Reference numeral 614 represents Y-axis that is indicative of magnitude of the switching signal. Similarly, reference numerals 612, 616 represent X-axis that is indicative of time. Further, reference numeral 602 is representative of the reference voltage. Reference numeral 604 is representative of the second DC voltage. Further, reference numeral 606 is representative of the switching signal received from the controller. As depicted in FIG. 6, the second DC voltage 604 is reduced below the reference voltage 602 due to variation in the one or more electric loads at a time instant 608. However, at the time instant 608, the controller varies a duty cycle of the switching signal 606 that is transmitted to the switching sub-unit of the contactless power transfer unit to control the second DC voltage so that the second DC voltage is matched with the reference voltage.

In accordance with the exemplary embodiments discussed herein, the exemplary system and method facilitate to protect one or more components in the wireless power transfer system without disconnecting the load. Further, the exemplary system and method facilitate to control or regulate the output voltage without changing the operating frequency of the wireless power transfer system. As a result, one or more components in the wireless power transfer system are protected without decoupling the components from each other. Further, variation of the voltage gain of the wireless power transfer system is substantially minimized by controlling the second DC voltage, which in turn reduces stress on the components of the wireless power transfer system.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

What claimed is:

1. A wireless power receiver for use with a wireless power transmitter having a first power exchange coil coupled to a first converting unit that converts an input power having a first DC voltage to a transmitted power having a first AC voltage based on a constant operating frequency, the wireless power receiver comprising:
a second power exchange coil configured to receive a received power from the first power exchange coil of the wireless power transmitter, the received power having a second AC voltage corresponding to the first AC voltage of the transmitted power;
a second converting unit configured to convert the second AC voltage of the received power to a second DC voltage, and provide the received power having the second DC voltage to an electric load; and
an active voltage tuning unit coupled to the second power exchange coil and configured to control the second DC voltage based on a difference between the second DC voltage and a reference voltage and at least one among a difference between a resonant frequency of the second power exchange coil and the constant operating frequency of the first converting unit and a difference between a phase angle of the first AC voltage and a phase angle of an AC current.

2. The wireless power receiver of claim 1, wherein the second power exchange coil is configured to magnetically couple to the first power exchange coil.

3. The wireless power receiver of claim 1, wherein the active voltage tuning unit comprises:
a switching sub-unit coupled in parallel to an impedance element which is coupled in series with one of the first power exchange coil and the second power exchange coil;
a controller coupled to the switching sub-unit and configured to:
vary a duty cycle of a switching signal based on the difference between the second DC voltage and the reference voltage, and at least one among the difference between the resonant frequency and the constant operating frequency and the difference between the phase angle of the first AC voltage and the phase angle of the AC current; and
provide the switching signal having the varied duty cycle to the switching sub-unit to control the second DC voltage across the electric load.

4. The wireless power receiver of claim 3, wherein the controller is configured to increase the duty cycle of the switching signal if the second DC voltage is less than the reference voltage and if at least one of the resonant frequency is less than the constant operating frequency and the phase angle of the AC current is less than the phase angle of the first AC voltage.

5. The wireless power receiver of claim 3, wherein the controller is configured to increase the duty cycle of the switching signal to increase the second DC voltage so that the second DC voltage matches with the reference voltage.

6. The wireless power receiver of claim 3, wherein the controller is configured to decrease the duty cycle of the switching signal if the second DC voltage is greater than the reference voltage and if at least one of the resonant frequency is less than the constant operating frequency and the phase angle of the AC current is less than the phase angle of the first AC voltage.

7. The wireless power receiver of claim 6, wherein the controller is configured to decrease the duty cycle of the switching signal to decrease the second DC voltage so that the second DC voltage matches with the reference voltage.

8. The wireless power receiver of claim 3, wherein the controller is configured to decrease the duty cycle of the switching signal if the second DC voltage is less than the reference voltage and if at least one of the resonant frequency is greater than the constant operating frequency and the phase angle of the AC current is greater than the phase angle of the first AC voltage.

9. The wireless power receiver of claim 8, wherein the controller is configured to decrease the duty cycle of the switching signal to increase the second DC voltage so that the second DC voltage matches with the reference voltage.

10. The wireless power receiver of claim 3, wherein the controller is configured to increase the duty cycle of the switching signal if the second DC voltage is greater than the reference voltage and if at least one of the resonant frequency is greater than the constant operating frequency and the phase angle of the AC current is greater than the phase angle of the first AC voltage.

11. The wireless power receiver of claim 10, wherein the controller is configured to increase the duty cycle of the switching signal to decrease the second DC voltage so that the second DC voltage matches with the reference voltage.

12. The wireless power receiver of claim 3, wherein the switching sub-unit comprises a first electronic switch and a second electronic switch coupled antiparallel to each other, wherein the controller is configured to activate and deactivate at least one of the first electronic switch and the second electronic switch based on the varied duty cycle of the switching signal.

13. The wireless power receiver of claim 12, wherein at least one of the first electronic switch and the second electronic switch is activated and deactivated to change an impedance of the second power exchange coil so that the second DC voltage is correspondingly changed across the electric load.

14. The wireless power receiver of claim 1, further comprising:
  a voltage sensor electrically coupled to the electric load and configured to determine the second DC voltage across the electric load; and
  a first transceiver coupled to the voltage sensor and configured to receive a voltage signal representative of the second DC voltage and provide the voltage signal representative of the second DC voltage to a second transceiver communicatively coupled to the first transceiver.

15. The wireless power receiver of claim 14, wherein the controller is further configured to:
  receive the voltage signal representative of the second DC voltage from the voltage sensor;
  receive a frequency signal representative of the difference between the resonant frequency and the constant operating frequency from the first converting unit via the first transceiver and the second transceiver; and
  receive a phase signal representative of the difference between the phase angle of the first AC voltage and the phase angle of the AC current from the first converting unit via the first transceiver and the second transceiver.

16. The wireless power receiver of claim 1, wherein the second converting unit is configured to provide the second DC voltage controlled by the active voltage tuning unit to a battery of a vehicle.

17. A method for operating a wireless power receiver for use with a wireless power transmitter having a first power exchange coil coupled to a first converting unit that converts an input power having a first DC voltage to a transmitted power having a first AC voltage based on a constant operating frequency, the method comprising:
  receiving, by a second power exchange coil, a received power from the first power exchange coil of the wireless power transmitter, the received power having a second AC voltage corresponding to the first AC voltage of the transmitted power;
  converting, by a second converting unit, the second AC voltage of the received power to a second DC voltage;
  providing the received power having the second DC voltage from the second converting unit to an electric load; and
  controlling, by an active voltage tuning unit, the second DC voltage based on a difference between the second DC voltage and a reference voltage and at least one among a difference between a resonant frequency of the second power exchange coil and the constant operating frequency of the first converting unit and a difference between a phase angle of the first AC voltage and a phase angle of an AC current.

18. The method of claim 17, wherein controlling the second DC voltage comprises:
  varying, by a controller, a duty cycle of a switching signal based on the difference between the second DC voltage and the reference voltage, and at least one of the difference between the resonant frequency and the constant operating frequency, and the difference between the phase angle of the first AC voltage and the phase angle of the AC current; and
  providing the switching signal having the varied duty cycle to a switching sub-unit to control the second DC voltage across the electric load.

19. The method of claim 18, wherein varying the duty cycle of the switching signal comprises:
  increasing the duty cycle of the switching signal if the second DC voltage is less than the reference voltage and if at least one of the resonant frequency is less than the constant operating frequency and the phase angle of the AC current is less than the phase angle of the first AC voltage; and
  decreasing the duty cycle of the switching signal if the second DC voltage is greater than the reference voltage and if at least one of the resonant frequency is less than the constant operating frequency and the phase angle of the AC current is less than the phase angle of the first AC voltage.

20. The method of claim 18, wherein varying the duty cycle of the switching signal comprises:
  decreasing the duty cycle of the switching signal if the second DC voltage is less than the reference voltage and if at least one of the resonant frequency is greater than the constant operating frequency and the phase angle of the AC current is greater than the phase angle of the first AC voltage; and
  increasing the duty cycle of the switching signal if the second DC voltage is greater than the reference voltage and if at least one of the resonant frequency is greater than the constant operating frequency and the phase angle of the AC current is greater than the phase angle of the first AC voltage.

\* \* \* \* \*